Sept. 28, 1965   G. O. RAWSTRON   3,208,151
TESTING OF SURFACE STRAIGHTNESS
Filed March 18, 1963   3 Sheets-Sheet 1
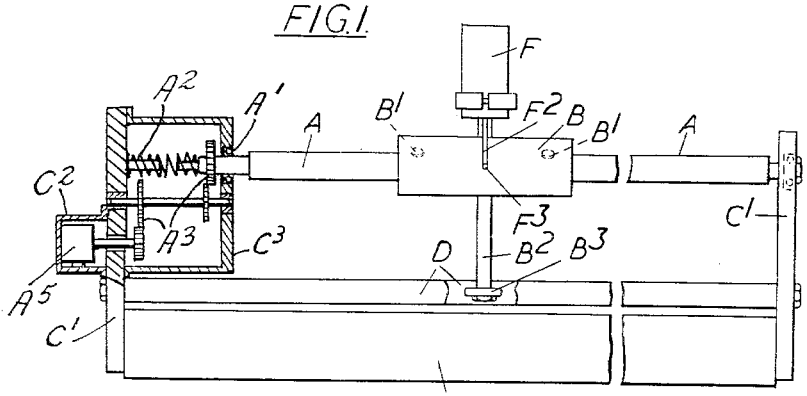
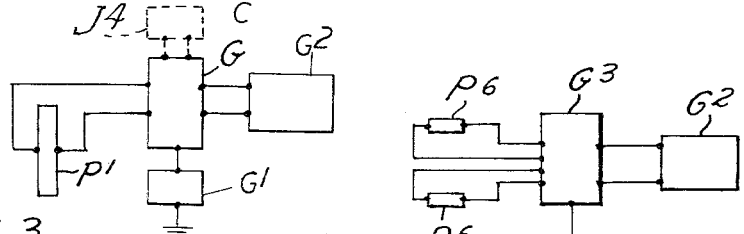
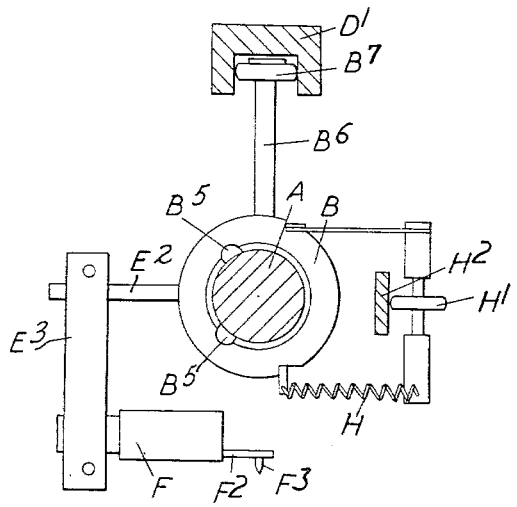
Inventor
G. O. Rawstron
By
Attorneys

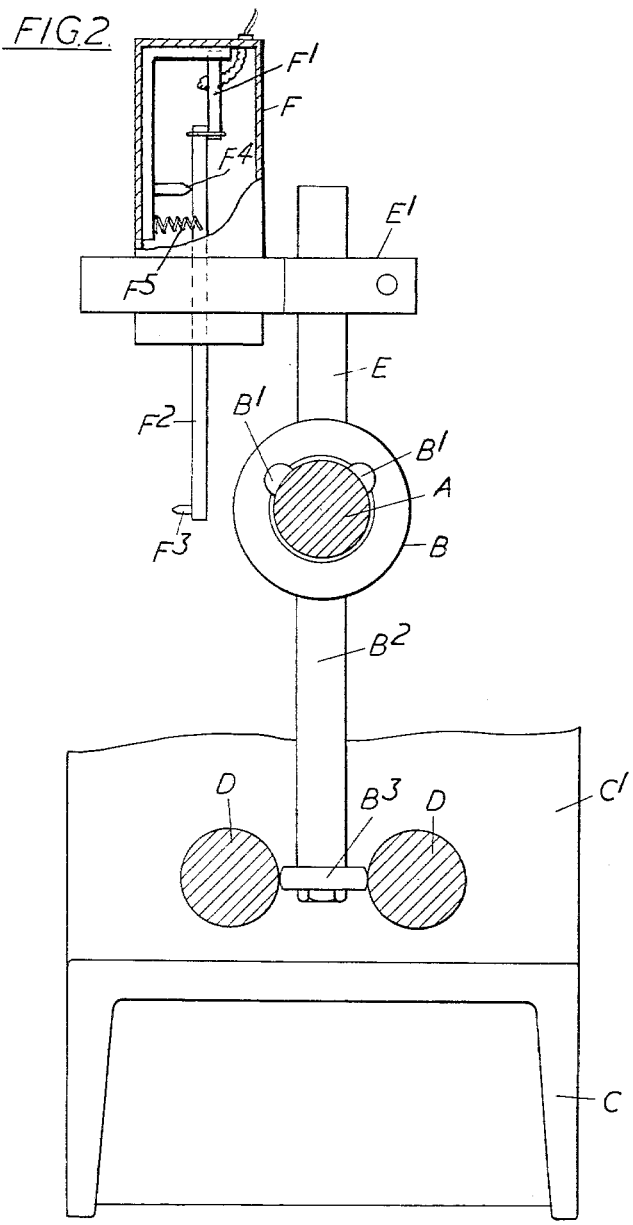

Sept. 28, 1965 G. O. RAWSTRON 3,208,151
TESTING OF SURFACE STRAIGHTNESS
Filed March 18, 1963 3 Sheets-Sheet 3
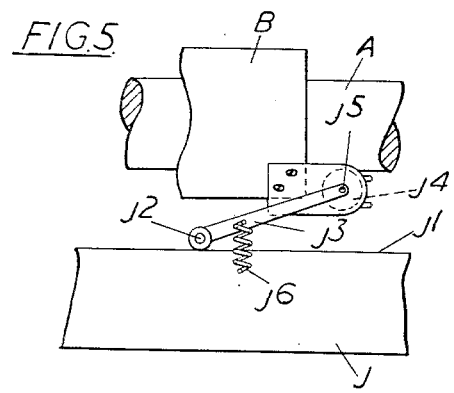
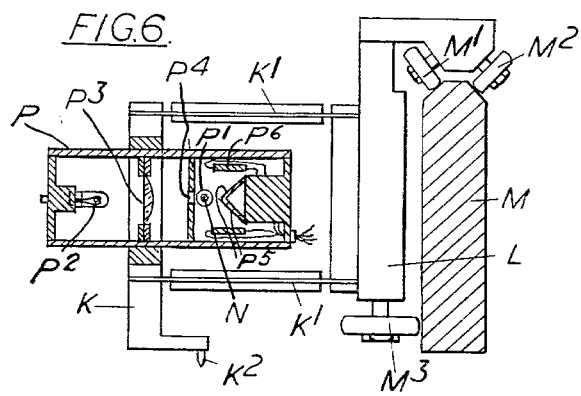
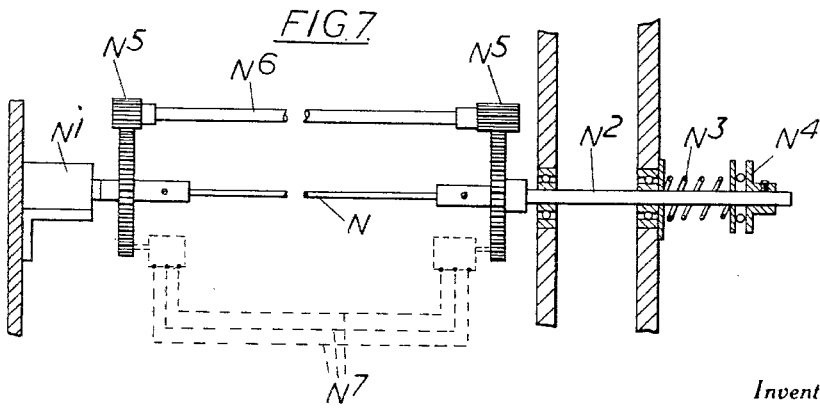
Inventor
G.O. Rawstron
By Holcomb, Wetherill & Brisebois
Attorneys 3,208,151
TESTING OF SURFACE STRAIGHTNESS
George O. Rawstron, Desford, England, assignor to Rank Precision Industries Limited, trading as Taylor, Taylor & Hobson, Leicester, England, a British company
Filed Mar. 18, 1963, Ser. No. 265,837
Claims priority, application Great Britain, Mar. 27, 1962, 11,644/62
15 Claims. (Cl. 33—174)

This invention relates to apparatus for measuring or indicating the deviations or departures from straightness along a surface.

In the testing of straightness by means of a feeler traversed relatively to the test surface, it is necessary that movement of the feeler normal to the test surface during traversing be detected with respect to a datum either representing substantially exact straightness or differing therefrom only a small known extent. For the former purpose it is theorotically possible either to provide an accurately straight guide which ensures that a carriage for the feeler is traversed bodily along an accurately straight path, in which instance the movement of the feeler normal to the test surface is detected relatively to such carriage, or alternatively to guide one point of the feeler carriage to move in an approximately straight line, and to provide on such carriage adjacent to the feeler a shoe which runs on an accurately straight datum surface, in which instance the movement of the feeler normal to the test surface is detected relatively to such shoe. The production of such a guide is in practice immensely difficult, while such a datum of sufficient length may be produced only at very great expense.

The present invention has for its object to provide improved apparatus for measuring or indicating straightness wherein a straightness datum is provided in a novel and readily practicable manner.

The apparatus for measuring or indicating the deviations or departures from straightness along a surface, according to the present invention, comprises a feeler, a carriage on which the feeler is mounted, means for urging the feeler into engagement with the test surface, an approximately straight shaft or wire mounted generally parallel to the test surface, means for rotating the approximately straight shaft or wire generally about its axis so that the mean position of such axis constitutes an accurately straight datum line for measurement or indication of lack of straightness of the test surface, means for moving the feeler carriage lengthwise of the rotating shaft or wire to cause the feeler to traverse a nominally straight path across the test surface, whereby the feeler executes a working movement generally normal to the test surface during traversing in accordance with the lack of straightness of such surface, the arrangement being such that this working movement of the feeler is effectively contained, throughout traversing, substantially in the plane normal to the test surface through the datum line, detecting means responsive to the working movement during traversing, and electrical means operated under the control of the detecting means for causing to be fed to a measuring or indicating instrument an electrical signal representing the working movement of the feeler during traversing relative to the datum line afforded by the rotating shaft or wire.

When the datum line is provided by a rotating shaft of sufficient rigidity, this may conveniently also constitute a guide for movement of the feeler carriage. In one such arrangement, the feeler is mounted on the carriage for movement relative thereto substantially in the plane normal to the test surface which passes through the axis of the rotating shaft, and the detecting means is constituted by an electrical detector responsive to such relative movement between the feeler carriage and the feeler during traversing and for generating an electrical signal output representing such relative movement, whilst the electrical means operated under the control of such detector includes an extracting device for excluding from the signal fed to the measuring or indicating instrument any variations of the signal output of the detector having a frequency equivalent to the speed of rotation of the shaft. In this arrangement, the rotating shaft should preferably be of accurately circular section throughout its operative length, the feeler carriage being guided for axial movement on such shaft by means of two axially spaced pairs of angularly spaced bearing elements on such carriage, while a fifth bearing element carried with such carriage is arranged to run on a parallel secondary shaft thereby substantially to prevent rotational movement of the carriage. The two axially spaced pairs of bearing elements in effect constitute an axially extended V-bearing having a bisecting plane passing through the axis of the shaft. Provided that this bisecting plane lies substantially at right angles to the plane, passing through the datum line, containing the working movement of the feeler, the above-described mounting of the carriage on the shaft avoids possible errors of measurement arising from small changes in the diameter of the shaft along its length or from small deviations from straightness in the secondary shaft.

Although due to the rotation of the shaft it is ensured that the means position of its axis constitutes an accurately straight datum line, nevertheless such axis itself may deviate from exact straightness by a small amount, thus giving rise to the signal variations in the output of the detector whch occur at the frequency of rotation of the shaft and require to be excluded from the signal fed to the measuring or indicating instrument. Such signal variations may be so excluded from the signal fed to the measuring or indicating instrument by the inclusion, in the electrical means operated under the control of the detector, of an electrical filter tuned to extract such unwanted signal variations. When such electrical filter is employed, however, it will be realised that the speed of rotation of the shaft should be such that none of the required signal variations, due to lack of straightness of the test surface, are excluded from the signal fed to the measuring or indicating instrument.

When the rotating shaft is mounted generally horizontally, and the working movement of the feeler is contained in a generally vertical plane, error of measurement may arise due to sag of the shaft. To compensate for such error, the electrical means operated under the control of the detector may conveniently include an electrical signal correcting device for acting on the signal output of the detector. Such signal correcting device may conveniently be controlled by a cam following member running on a cam shaped in accordance with the measurement or indication obtained by traverse of the feeler along a precisely straight surface, for example an accurate optical flat, the cam and the cam following member being moved relatively to one another in use in synchronism with the traversing movement of the feeler across the test surface.

The feeler carriage may alternatively be moved on guides separate from the rotating shaft or wire. In such an arrangement wherein the feeler carriage is mounted for movement on separate substantially straight guides substantially parallel to the rotating shaft or wire, this mounting permits the feeler carriage and feeler to move together relatively to the guides in a direction generally normal to the test surface, with the feeler contained substantially in the plane normal to the test surface which passes through the axis of the rotating shaft or wire and the detecting means is responsive to such relative movement between the feeler carriage and the rotating shaft or wire during traversing. The feeler carriage may for example be mounted on a guided traversing member by means of two or more parallel spring ligaments capable of flexing to permit movement of such feeler carriage, and thus of the feeler carried thereby, in a direction generally normal to the test surface.

In this alternative arrangement, the detecting means may conveniently comprise an optical detector having on opposite sides of the rotating shaft or wire a source of light and a beam-splitting device, whereby relative movement between the feeler carriage and the rotating shaft or wire produces differential changes in the strengths of the beams emergent from the beam-splitting device, and the electrical means operated under the control of such detector includes a pair of photo-electric devices respectively for receiving such beams emergent from the beam-splitting device and for causing an electrical signal output to be generated representing the difference in the strengths of such emergent beams.

As in the previous arrangement, the electrical means operated under the control of the detector may include means, such as an electrical filter, for excluding from the signal fed to the measuring or indicating instrument signal variations of the differential output of the photo-electric devices having a frequency equivalent to the speed of rotation of the shaft or wire. Such unwanted signal variations may arise due to lack of straightness of the axis of the shaft or wire or due to eccentricity of its rotational movement with respect to its bearings or both. A signal correcting device may also be employed, and be controlled for example by a cam in the above-described manner, to act on the differential output of the photo-electric devices to compensate when necessary for signal variation arising due to sag of the shaft or wire. It will also be appreciated that in this alternative arrangement, the rotation of the shaft or wire also serves to ensure that, due to the differential action of the photo-electric devices, possible errors are avoided due to small changes in the diameter of the shaft or wire along its length.

Further features and advantages of the invention will be apparent from the practical arrangements of straightness testing apparatus now to be described by way of example, with reference to the accompanying drawings, in which FIGURE 1 shows a preferred arrangement diagrammatically in front elevation, FIGURE 2 shows the preferred arrangement diagrammatically in enlarged transverse section, FIGURE 3 indicates the output means of the apparatus, FIGURE 4 shows a modified arrangement diagrammatically in transverse section, FIGURE 5 shows a correction device for use in the apparatus, FIGURE 6 shows a further arrangement diagrammatically in transverse section, FIGURE 7 shows the mounting of a rotating wire used in the further arrangement, and FIGURE 8 indicates the output means for the further arrangement.

In one arrangement (see FIGURES 1 and 2), a generally horizontal shaft A supporting a carriage B is rotatably mounted between end bearings $A^1$ respectively carried by two supporting end plates $C^1$ upstanding from a rectangular base C. At one end of the shaft A, a coil spring $A^2$ under compression acts to hold such shaft against any axial movement in its bearings $A^1$, while at such same shaft end, a simple gearing $A^3$ connects the shaft with the spindle $A^4$ of an electric motor $A^5$. The electric motor $A^5$ is housed in a box $C^2$ on the outside face of the appropriate supporting end plate $C^1$ while the gearing $A^3$, together with the spring $A^2$, is housed in another box $C^3$ on the inside face of such end plate. By this means the shaft A may be rotated at a suitable fairly slow speed, for example about 300 revolutions per minute.

The carriage supporting shaft A, which is lapped to be of accurately round section throughout its operative length, is mounted adjacent to the upper edges of the supporting end plates $C^1$, the carriage B being in the form of a cylindrical shell resting on the shaft for longitudinal movement thereon through two longitudinally spaced pairs of angularly spaced bearing pads $B^1$, the pads of each pair being disposed at equal angles to the vertical on opposite sides thereof. Thus in effect, the carriage B is supported on an axially extended V-bearing having a vertical bisecting plane passing through the axis of the shaft A. The carriage B has fixed to it an arm $B^2$ extending vertically downwards towards the base plate, the lower end of such arm $B^2$ carrying a runner $B^3$ engaging between two parallel secondary shafts D mounted side by side parallel to the carriage supporting main shaft A and between the two supporting end plates $C^1$ near the lower edges thereof. The last described runner thus serves to prevent rotational movement of the carriage B about the rotating main shaft A.

Extending upwardly from the carriage is a vertical support E having a cross-piece $E^1$ carrying a pick-up unit. Such pick-up unit comprises a casing F, a detecting device $F^1$, such for example as an electro-magnetic detector or a piezo-electric crystal (as shown), housed in the casing, and a feeler $F^3$ carried by a generally vertical feeler supporting arm $F^2$ operatively connected at its upper end to the detecting device $F^1$ and projecting downwardly out of the pick-up casing F. The feeler $F^3$ is carried by the lower end of its supporting arm $F^2$ effectively in the horizontal plane passing through the axis of the rotating main shaft A, or more accurately, through the mean position of such axis as the shaft is rotated, the feeler supporting arm $F^2$ being pivoted at $F^4$ to a pick-up casing and spring-biased at $F^5$ relatively thereto to urge the feeler $F^3$ away from the rotating main shaft A into engagement with the surface of the workpiece (not shown) to be tested, such workpiece being suitably supported with the test surface lying substantially parallel to the rotating main shaft A and normal to the horizontal plane through the axis of such main shaft.

With this arrangement, when the carriage B is moved along the rotating main shaft A, either by hand or by means of a suitable prime mover, the feeler $F^3$ is traversed in a nominally straight horizontal path along the test surface, and executes a further movement, generally normal to such test surface, in accordance with the lack of straightness of such surface. This working movement takes place effectively in the horizontal plane through the mean position of the axis of the rotating main shaft A, and since such mean position defines an accurately straight line, it constitutes a convenient datum line relative to which the working movement of the feeler $F^3$ is measured. Due to the previously described mounting of the feeler carriage B on the rotating main shaft A, that is, on a V-bearing whose bisecting plane lies parallel to the test surface, small changes in the diameter of such shaft can give rise to deviations in the straight line movement of the carriage, and thus also of the feeler $F^3$, only in a direction parallel to the test surface generally at right angles to the traverseing direction, and errors of measurement arising thereby are negligible. Furthermore, a small lack of straightness of the secondary shafts D causing small pivotal movements of the carriage B about the rotating shaft A, can also give rise, owing to the fact that the feeler $F^3$ is substantially contained in that plane normal to the test surface which passes through the datum line, to deviations in the straight line traversing movement of the feeler only in a direction parallel to the test surface generally at right angles to the traversing direction, such errors of measurement arising thereby also being negligible. Thus, the only unwanted relative movements taking place between the detecting device $F^1$ and the feeler $F^3$ are those due to small errors in straightness of the axis of the rotating main shaft A. This may result in errors up to 0.00003 of an inch in actual measurement. However, the unwanted relative movements between feeler $F^3$ and detector $F^1$ occur at the frequency of the rotation of the main shaft, and cause signal variations at a corresponding frequency in the output of the detecting device. These unwanted variations being removed, the remainder of the output of the detecting device constitutes a signal representing the lack of straightness of the test surface, for feeding to a measuring or indicating instrument after amplification. As indicated in FIGURE 3, for extracting from the signal output of the detecting device $F^1$ the unwanted signal variations, the amplifier G to which such signal output is fed is associated with a filter circuit $G^1$ tuned to the frequency of revolution of the main shaft A. The unwanted signal variations pass through the filter $G^1$ to earth, and are thus excluded from the amplified signal fed to the measuring or indicating instrument $G^2$. In use, traversing is of course effected at such a speed that the filter $G^1$ does not act to extract any signal variations arising from the deviations or departures from straightness of the test surface. In practice the apparatus may be designed with a length of traverse of say two to three feet, and may be used for testing surface straightness along a path up to this length.

The above-described apparatus is arranged for the testing of a surface lying normal to the horizontal plane containing the working movement of the feeler. In a modified arrangement shown in FIGURE 4, the carriage B is mounted on the rotating main shaft A by means of bearing elements $B^5$ forming a V-bearing having a horizontal bisecting plane, engagement at such bearing being maintained by means of a spring-loading device H acting on the carriage through a roller $H^1$ running on an abutment bar $H^2$. The modified arrangement of FIGURE 4 is generally similar to that above-described, as will be clear from the following further identification of parts. $B^6$ is the arm carrying the runner $B^7$, in this case engaging a channel section guide $D^1$ instead of a pair of secondary shafts. $E^2$ is the stylus support, in this instance horizontal, while $E^3$ is the arm mounted on such support to carry the pick-up casing F. This casing F is arranged in an identical manner to that previously described with reference to FIGURE 2, the stylus arm $F^2$ carrying the stylus $F^3$ being pivotally mounted relative to such casing. In this modified arrangement, the working movement of the feeler $F^3$ is arranged to take place in the vertical plane through the axis of the rotating main shaft A, the test surface being mounted normal to such vertical plane, and errors of measurement arise due to sag of such rotating main shaft A. Conveniently, a signal correcting device may be employed to compensate for these further errors.

Such correcting device is shown in FIGURE 5 and conveniently comprises a fixed cam J having a surface $J^1$ shaped in accordance with the measurement obtained by traversing the feeler $F^3$ along a precisely straight horizontal surface, a cam follower consisting of a roller $J^2$ for following the shaped cam during traversing, a pivoted arm $J^3$ carrying the roller and thereby caused to move rotationally about its pivot in accordance with the shape of the cam, and a variable potentiometer $J^4$ operated by the pivoted arm and causing a correcting voltage to be applied at the amplifier G (see FIGURE 4) to which is fed the filtered output of the detecting device $F^1$. The cam J is conveniently formed from a length of stiff strip material, for example plastics material, one edge of which is cut to a shape representing, at a magnification of 10,000:1, the measurement obtained by traversing the stylus over an accurate optical flat mounted horizontally. The strip-like cam J is fixedly mounted with its shaped edge $J^1$ uppermost and its length parallel to the direction of traversing, the potentiometer $J^4$ being mounted on the traversing carriage B, and the arm $J^3$ carrying the cam follower $J^2$ being pivoted at $J^5$ relative to such carriage B, spring urged at $J^6$ about its pivot, and operatively coupled to the potentiometer. The correct positioning of the cam J in the direction of traversing is determined by testing the apparatus on the optical flat. If the movement of the cam follower $J^2$ is accurately synchronised with the traversing movement, a zero indication is obtained at the measuring instrument throughout the traverse of the feeler $F^3$ along such optical flat. The last-mentioned test having been satisfactorily carried out, the apparatus is ready for use in testing the straightness of a horizontal surface along a nominally straight path thereon.

The same arrangement of apparatus will usually be usable for the testing of surfaces mounted vertically or horizontally, a switch being provided to cut out of action the potentiometer of the cam correcting device when correaction for sag of the shaft is not required.

It will be clear that although the provision in the apparatus of the cam correcting device above-described requires the production, at considerable expense, of a very accurate optical flat, this does not form part of the apparatus, and one such optical flat may be used for the production of any number of correcting devices, each having a cam shape appropriate to the apparatus in which it is to be incorporated.

It may also be mentioned that, in some circumstances, it may be practicable to use the above-described cam correcting device, instead of the electrical filter, to compensate for the unwanted signal variations, in the output of the detecting means, which occur at the frequency of rotation of the main shaft. However, to produce a cam for this purpose is rather difficult, since such cam requires to possess a rapidly undulating shaped edge appropriate to the rotational speed of the shaft. Furthermore, the use of such a cam necessitates the maintenance of a very high degree of synchronism between the rate of feeler traverse and such rotational speed of the main shaft.

In another practical construction of straightness testing apparatus (FIG. 6), the feeler $K^2$ projects downwardly from a support K whereon it is fixedly mounted, such feeler support being supported in a generally vertical position on the front ends of a pair of generally horizontal spring ligaments $K^1$ spaced vertically apart, the rear ends of such ligaments being secured to a traversing carriage L. The traversing carriage L is mounted to run in a transverse direction on a fixed approximately straight horizontal guide M by means for example of three rollers, two such rollers $M^1$ and $M^2$ engaging respectively with oppositely inclined faces formed along the upper edge of the guide M, and one roller $M^3$ engaging with the adjacent vertical front face of the guide M. Conveniently, the spring ligaments $K^1$ are biased to urge the feeler $K^2$ downwardly into engagement with the test surface, the workpiece (not shown) being suitably supported with such surface uppermost and lying substantially parallel to the direction of traverse. Thus, when traversing is effected by movement of the carriage L along the guide M, the ligaments $K^1$ flex to permit movement of the feeler $K^2$ in a direction generally normal to the test surface in accordance with the lack of straightness of such surface, this working movement of the feeler $K^2$ being contained in a generally vertical plane parallel to the direction of traversing. It will be appreciated however that, during traversing, flexing of the ligaments may also take place due to lack of straightness of the guide M.

Mounted directly above the feeler $K^2$, in the plane of the working movement thereof, is a length of wire N extending horizontally in a transverse direction, i.e. parallel to the traversing direction. The mounting of this wire N is indicated in FIGURE 7, one end of such wire N being operatively connected to the shaft of an electric motor $N^1$ and the other end being operatively connected to a rotatable spindle $N^2$ through which a tensioning force is applied to the wire N by means of a tensioning device comprising a tensioning spring $N^3$ and a thrust bearing $N^4$. The wire N is preferably rotatably driven at both ends, for example by means of a direct mechanical coupling comprising gearing $N^5$ and a coupling shaft $N^6$, provided that the rotating wire dependent on the required length of traverse is not too great. FIGURE 7 also illustrates at the broken lines thereof an alternative coupling which is preferred when the wire N is relatively long, such coupling comprising a Selsyn synchronising linkage $N^7$. The wire is conveniently rotated at a fairly high speed, say of several thousand revolutions per minute. The mean position of the axis of the wire N during rotation constitutes an accurately straight datum line for measurement of lack of straightness of the test surface.

On the feeler support K vertically between the ligament connections thereto is carried a tubular casing P having its axis horizontal and intersecting at right angles the rotating wire N. At an intermediate position in its length, this tubular casing P has diametrically opposite holes $P^1$ through which the rotating wire N passes, thus permitting the casing to move along such wire during traversing. The tubular casing P housing an optical detector consisting of a source of light $P^2$, a collimating lens $P^3$, a diaphragm $P^4$ disposed just in front of the rotating wire N and having a horizontal slit of vertical depth slightly greater than the diameter of such wire, a beam-splitting prism $P^5$ behind the rotation wire, and a pair of photo-electric devices $P^6$ for receiving the beams emergent from the beam splitter. This optical axis of the detector coincides with the axis of the casing, being horizontal and intersecting at right angles the rotating wire. As shown in FIGURE 8, the differential output of the photo-electric devices $P^6$ is amplified conveniently at a summing amplifier $G^3$, and fed to the measuring or indicating instrument $G^2$, a reading of zero thus being obtained when the axis of the optical detector intersects the mean position of the axis of the rotating wire N, since in this position the rotating wire cuts off from the two photo-electric devices equal amounts of the collimated light passing through the diaphragm $P^4$. In use, however, when the feeler $K^2$ traverses the test surface, the working movement of the feeler normal to the test surface is reproduced as vertical movement of the optical detector relative to the rotating wire N, causing a state of varying unbalance in which one photo-electric device $P^6$ receives more light than the other. The differential output of the photo-electric devices thereby represents the working movement of the feeler $K^2$ due to the departures or deviations of the test surface from straightness. Owing to the differential action of the photo-electric devices $P^6$, and the relatively high speed of rotation of the wire N, errors due to small changes in the diameter of the wire along its length are substantially avoided. Furthermore, since the rotating wire N is positioned in the plane of the working movement of the feeler $K^2$, and the optical detector reproduces in such plane such working movement of the feeler, irrespective of flexure of the lagaments $K^1$ due to lack of straightness of the guide M for the traversing carriage L, this lack of straightness of the guide is not a source of error. Errors of measurement do still arise however due to small lack of straightness of the axis of the wire N, and also due to any small non-alignment of the axis of the wire with the axis of rotation. Since these errors occur at the frequency of rotation, they may be extracted from the output of the optical detector by means of an electrical filter $G^4$ (see FIGURE 8) analogous to that described in connection with the previous arrangement. Furthermore, when the working movement of the feeler $K^2$ takes place in a vertical plane, as above described, error arises due to sag of the wire N. The previously described cam correcting device may be employed to compensate for these errors, and, as before, means may be provided for switching out the action of this cam correcting device when the arrangement is used with the working movement of the feeler contained in a horizontal plane.

In a modification of the last described arrangement, the wire is replaced by a thin shaft. In this case, small errors of measurement may again be introduced due to the fact that the axis of such shaft is not precisely straight, and also, when testing a horizontal surface, due to shaft sag. These may be corrected for in the manner above-described with reference to the rotating wire arrangement.

It will be appreciated that the above-described arrangements are by way of example only and may be modified in various ways within the scope of the invention.

What I claim as my invention and desire to secure by Letters Patent is:

1. Apparatus for measuring lack of straightness along a surface, comprising a feeler, a carriage on which the feeler is mounted, means for urging the feeler into engagement with the test surface, an approximately straight elongated datum element generally symmetrical about its longitudinal axis, means for mounting the datum element generally parallel to the test surface, means for rotating the approximately straight datum element generally about its axis so that the mean position of such axis constitutes an accurately straight datum line for measurement of the lack of straightness of the test surface, means for moving the feeler carriage lengthwise of the datum element to cause the feeler to traverse a nominally straight path across the test surface, whereby the feeler executes a working movement generally normal to the test surface during traversing in accordance with the lack of straightness of such surface, the arrangement being such that this working movement of the feeler is effectively contained, throughout traversing, substantially in the plane normal to the test surface through the datum line, detecting means responsive to the working movement during traversing, and electrical means operated under the control of the detecting means for causing to be fed to a measuring instrument an electrical signal representing the working movement of the feeler during traversing relative to the datum line afforded by the rotating datum element.

2. Apparatus for measuring lack of straightness along a surface as claimed in claim 1 in which the datum element is constituted by a shaft, and the feeler carriage is mounted on such rotating shaft for lengthwise movement thereon, the feeler being mounted on such carriage for movement relative thereto substantially in the plane normal to the test surface which passes through the axis of the rotating shaft, and the detecting means is constituted by an electrical detector responsive to such relative movement between the feeler carriage and the feeler during traversing and for generating an electrical signal output representing such relative movement, whilst the electrical means operated under the control of such detector includes an extracting device for excluding from the signal fed to the measuring instrument any variations of the signal output of the detector having a frequency equivalent to the speed of rotation of the shaft.

3. Apparatus for measuring lack of straightness along a surface as claimed in claim 2 in which the extracting device consists of an electrical filter tuned to exclude from the signal fed to the measuring instrument signal variations having a frequency equivalent to the speed of rotation of the shaft.

4. Apparatus for measuring lack of straightness along a surface as claimed in claim 3 in which the electrical means operated under the control of the detector includes an electrical signal correcting device for acting on the signal output of the detector to compensate for signal variation arising from sag of the rotating shaft, such shaft being mounted generally horizontally and the working movement of the feeler being contained in a generally vertical plane.

5. Apparatus for measuring lack of straightness along a surface as claimed in claim 4 in which the signal correcting device is controlled by a cam following member running on a cam shaped in accordance with the measurement or indication obtained by traverse of the feeler along a precisely straight surface, for example an accurate optical flat, the cam and the cam following member being moved relatively to one another in use in synchronism with the traversing movement of the feeler across the test surface.

6. Apparatus for measuring lack of straightness along a surface as claimed in claim 5 in which the rotating shaft is of accurately circular section throughout its operative length, and the feeler carriage is guided for axial movement on such shaft by means of a V-bearing defined by two axially spaced pairs of angularly spaced bearing elements on such carriage, the bisecting plane of such bearing being substantially at right angles to the plane containing the working movement of the feeler, whilst a fifth bearing element carried with such carriage is arranged to run on a parallel secondary shaft thereby substantially to prevent rotational movement of the carriage.

7. Apparatus for measuring lack of straightness along a surface as claimed in claim 2 in which the electrical means operated under the control of the detector includes an electrical signal correcting device for acting on the signal output of the detector to compensate for signal variation arising from sag of the rotating shaft, such shaft being mounted generally horizontally and the working movement of the feeler being contained in a generally vertical plane.

8. Apparatus for measuring lack of straightness along a surface as claimed in claim 2 in which the rotating shaft is of accurately circular section throughout its operative length, and the feeler carriage is guided for axial movement on such shaft by means of a V-bearing defined by two axially spaced pairs of angularly spaced bearing elements on such carriage, the bisecting plane of such bearing being substantially at right angles to the plane containing the working movement of the feeler, whilst a fifth bearing element carried with such carriage is arranged to run on a parallel secondary shaft thereby substantially to prevent rotational movement of the carriage.

9. Apparatus for measuring lack of straightness along a surface as claimed in claim 1 in which the feeler carriage is mounted on substantially straight guides for movement lengthwise of the rotating datum element, such mounting permitting the feeler carriage and feeler to move together relatively to the guides in a direction generally normal to the test surface, with the feeler contained substantially in the plane normal to the test surface which passes through the axis of the rotating datum element, and the detecting means is responsive to such relative movement between the feeler carriage and the rotating datum element during traversing.

10. Apparatus for measuring lack of straightness along a surface as claimed in claim 9 in which the detecting means comprises an optical detector having on opposite sides of the rotating datum element a source of light and a beam-splitting device, whereby relative movement between the feeler carriage and the rotating datum element produces differential changes in the strengths of the beams emergent from the beam-splitting device, and the electrical means operated under the control of such detector includes a pair of photo-electric devices respectively for receiving such beams emergent from the beam-splitting device and for causing an electrical signal output to be generated representing the difference in the strength of such emergent beams.

11. Apparatus for measuring lack of straightness along a surface as claimed in claim 10 in which the electrical means operated under the control of the detector also includes an extracting device for excluding from the signal fed to the measuring instrument signal variations of the differential output of the photo-electric devices having a frequency equivalent to the speed of rotation of the datum element.

12. Apparatus for measuring lack of straightness along a surface as claimed in claim 11 in which the electrical means operated under the control of the detector includes an electrical signal correcting device for acting on the differential output of the photo-electric devices to compensate for signal variation arising from sag of the rotating datum element, such datum element being mounted generally horizontally and the working movement of the feeler being contained in a generally vertical plane.

13. Apparatus for measuring lack of straightness along a surface as claimed in claim 12 in which the signal correcting device is controlled by a cam following member running on a cam shaped in accordance with the measurement or indication obtained by traverse of the feeler along a precisely straight surface, for example an accurate optical flat, the cam and the cam following member being moved relatively to one another in use in synchronism with the traversing movement of the feeler across the test surface.

14. Apparatus for measuring lack of straightness along a surface as claimed in claim 13 in which the feeder carriage is mounted on a guided traversing member by means of two or more parallel spring ligaments capable of flexing to permit movement of such feeler carriage, and thus of the feeler carried thereby, in a direction generally normal to the test surface.

15. Apparatus for measuring lack of straightness along a surface as claimed in claim 9 in which the feeler carriage is mounted on a guided traversing member by means of two or more parallel spring ligaments capable of flexing to permit movement of such feeler carriage, and thus of the feeler carried thereby, in a direction generally normal to the test surface.

References Cited by the Examiner

UNITED STATES PATENTS 2,491,016   12/49   Reason _____ 73—105

FOREIGN PATENTS 1,230,164   6/60   France.
956,891   1/57   Germany.

ISAAC LISANN, *Primary Examiner.*

LEONARD FORMAN, *Examiner.*